United States Patent [19]

Kramer

[11] Patent Number: 4,718,959

[45] Date of Patent: Jan. 12, 1988

[54] METHOD OF MAKING A BEARING ASSEMBLY

[75] Inventor: James H. Kramer, Akron, Ohio

[73] Assignee: The B. F. Goodrich Company, Akron, Ohio

[21] Appl. No.: 803,441

[22] Filed: Dec. 2, 1985

[51] Int. Cl.$^4$ ........................ B21D 53/10; B31C 13/00

[52] U.S. Cl. .................................. 156/188; 156/189; 156/190; 156/191; 156/289; 156/307.3; 156/307.7; 29/149.5 S; 29/149.5 NM

[58] Field of Search ............... 156/188, 189, 190, 187, 156/191, 306.9, 307.3, 307.7, 184, 289, 90; 29/149.5 C, 149.5 DP, 149.5 S, 149.5 NM; 384/97

[56] References Cited

U.S. PATENT DOCUMENTS

| | | | |
|---|---|---|---|
| 2,589,786 | 3/1952 | Engel | 156/289 |
| 3,507,023 | 4/1970 | Matt | 156/188 |
| 4,331,496 | 5/1982 | Orndorff | 156/187 |
| 4,344,806 | 8/1982 | Kramer | 156/192 |
| 4,512,836 | 4/1985 | Tucci | 156/289 |
| 4,596,619 | 6/1986 | Marks | 156/188 |

Primary Examiner—Donald E. Czaja
Assistant Examiner—J. Davis
Attorney, Agent, or Firm—Joseph Januszkiewicz

[57] ABSTRACT

The method of making a non-metallic bearing assembly by bonding a first layer of uncured rubber that is wrapped on a mandrel to a fiberglass layer whose outer wrappings are impregnated with epoxy resin. The fiberglass outer layer is cured first to form a rigid outer plastic shell and then the uncured rubber is vulcanized to give an inner rubber sleeve whose inner periphery has polygonal contour which is the cross sectional configuration of the mandrel. An inner layer of fiberglass, cement impregnated, interconnects the fiberglass outer plastic shell to the inner rubber sleeve.

5 Claims, 6 Drawing Figures

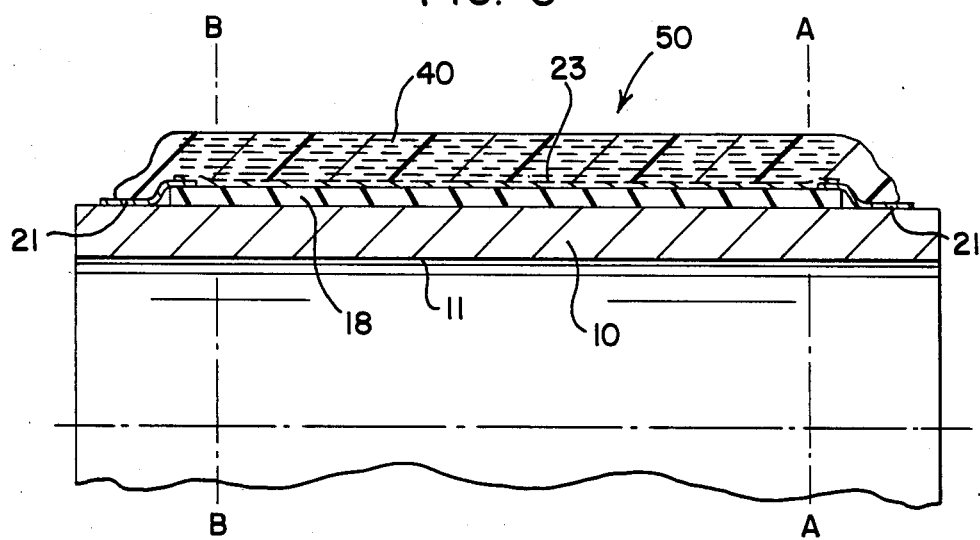

METHOD OF MAKING A BEARING ASSEMBLY

BACKGROUND OF THE INVENTION

This invention relates to a bearing assembly and more particularly to the method of making a liquid lubricated bearing assembly having an annular inner sleeve with a plurality of circumferentially spaced resilient elastomeric bearing surfaces secured within an outer rigid non-metallic shell.

Elastomeric journal bearings are particularly suited for supporting for rotation marine propeller shafts because of their ability to withstand the harmful effects of the corrosive fluids and the abrasion resulting from bits of foreign materials which are carried in suspension in the sea water that passes between the propeller shaft and the bearing elements of the bearing assembly. The elastomeric sleeve of the bearing assembly and its bearing surfaces along with a rigid non-metallic shell can be made efficiently and it is an object of the present invention to provide a method of manufacturing these bearing assemblies that is less expensive than those heretofore made. The present invention is particularly advantageous to use in the manufacture of small size bearings because the unique method facilitates their manufacture at a more cost effective process than heretofore. The method employed has the further advantage of being able to produce such assemblies utilizing normal machine shop equipment and procedure.

SUMMARY OF THE INVENTION

The present invention is directed to a new and improved process for fabricating an elastomeric bearing with a rigid non-metallic outer shell by first wrapping a layer of uncured rubber onto a mandrel that has a polygonal cross section. A layer of cement is then applied to the layer of uncured rubber after which fiberglass is wrapped around the mandrel to form a thin layer that is bonded to the cement. Thereafter, additional fiberglass is wrapped while being impregnated with an epoxy resin, which on curing forms a rigid outer shell. The entire assembly is then cured to vulcanize the rubber to form a completed bearing assembly.

BRIEF DESCRIPTION OF THE DRAWINGS

FIG. 5 is a fragmentary front elevational view in cross section of an uncured elastomeric journal bearing assembly on the mandrel taken on line 5—5 of FIG. 4;

DISCLOSURE OF THE INVENTION

Figure 1:
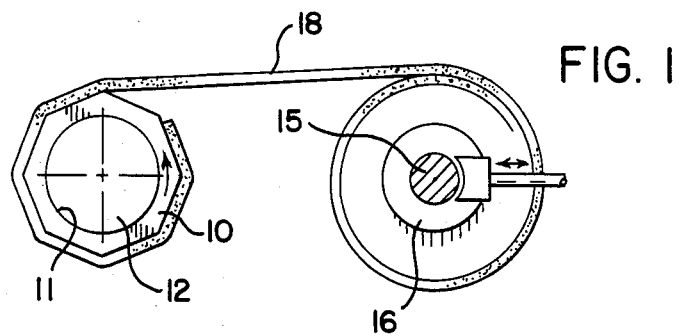
FIG. 1 is a schematic side elevational view, depicting the wrapping of a ribbon of elastomeric material onto a mandrel.
Figure 4:
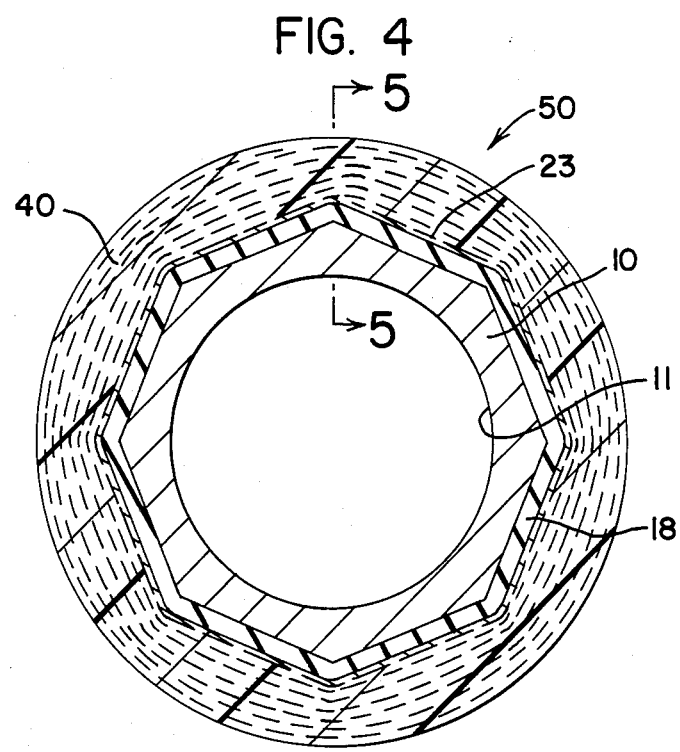
FIG. 4 is a side elevational view in cross section of an uncured elastomeric journal bearing assembly on the mandrel prior to cure.

Referring to the drawings, wherein like reference numerals designate like or corresponding parts throughout the several views, there is shown in FIGS. 1 and 4 a mandrel 10 having an octagonal shaped outer surface configuration and a cylindrical inner bore 11 that is received by a shaft 12.

Figure 2:
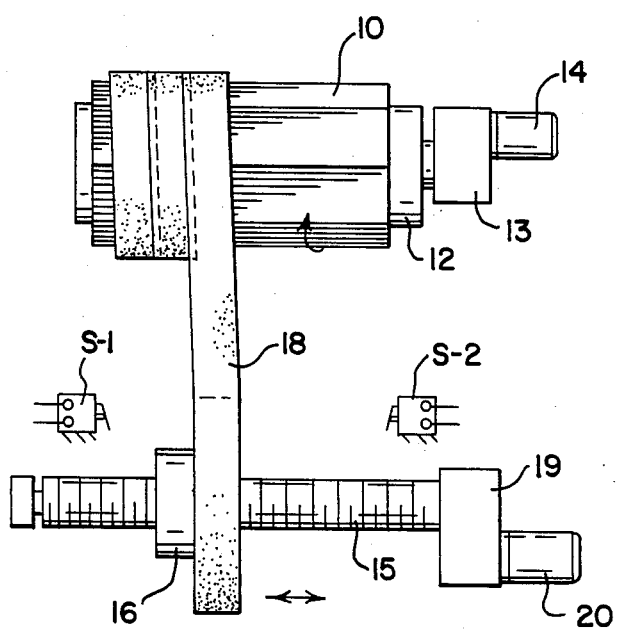
FIG. 2 is a schematic plan view of an apparatus for wrapping a ribbon of elastomeric material onto an octagonal mandrel.

Shaft 12, as schematically shown in FIGS. 1 and 2, is suitably supported for rotation through the output of a transmission means 13 powered by a variable speed motor 14.

Mounted on a threaded shaft 15 which is parallel to the axis of shaft 12 is a supply spool 16 having a ribbon of an elastomer or rubber 18 wound thereon. The speed of rotation of shaft 15 is controlled by a transmission means 19 which in turn is controlled by a variable speed motor 20. The reciprocating movement of supply spool 16 is controlled by adjustable limit switches S-1 and S-2. As seen in FIGS. 1 and 2, a single thickness of rubber ribbon 18 is wound onto mandrel 10 to form the uncured bearing surface of the bearing assembly.

The elastomeric material of which the ribbon 18 is made is a suitable natural, synthetic rubber or a rubber having a combination of these materials that can be vulcanized to exhibit a low coefficient of friction when lubricated with water. The elastomeric material should have adequate resiliency, strength and sufficient heat resistance to assure a universal application as a bearing assembly. As an example of acceptable elastomers for use as a ribbon is conventional nitrile rubber compositions, particularly rubber compositions comprising polymers of butadiene and acrylonitrile where butadiene is the major component of the polymer. Neoprene, nitrile, hypalon, Viton, SBR or any of the general family of elastomeric materials may be used. Natural and other synthetic rubber compositions are available for such use, having the properties discussed above.

In lieu of a ribbon of rubber 18 wound onto the mandrel 10, a single wide piece of rubber may be wound onto the mandrel.

Figure 6:
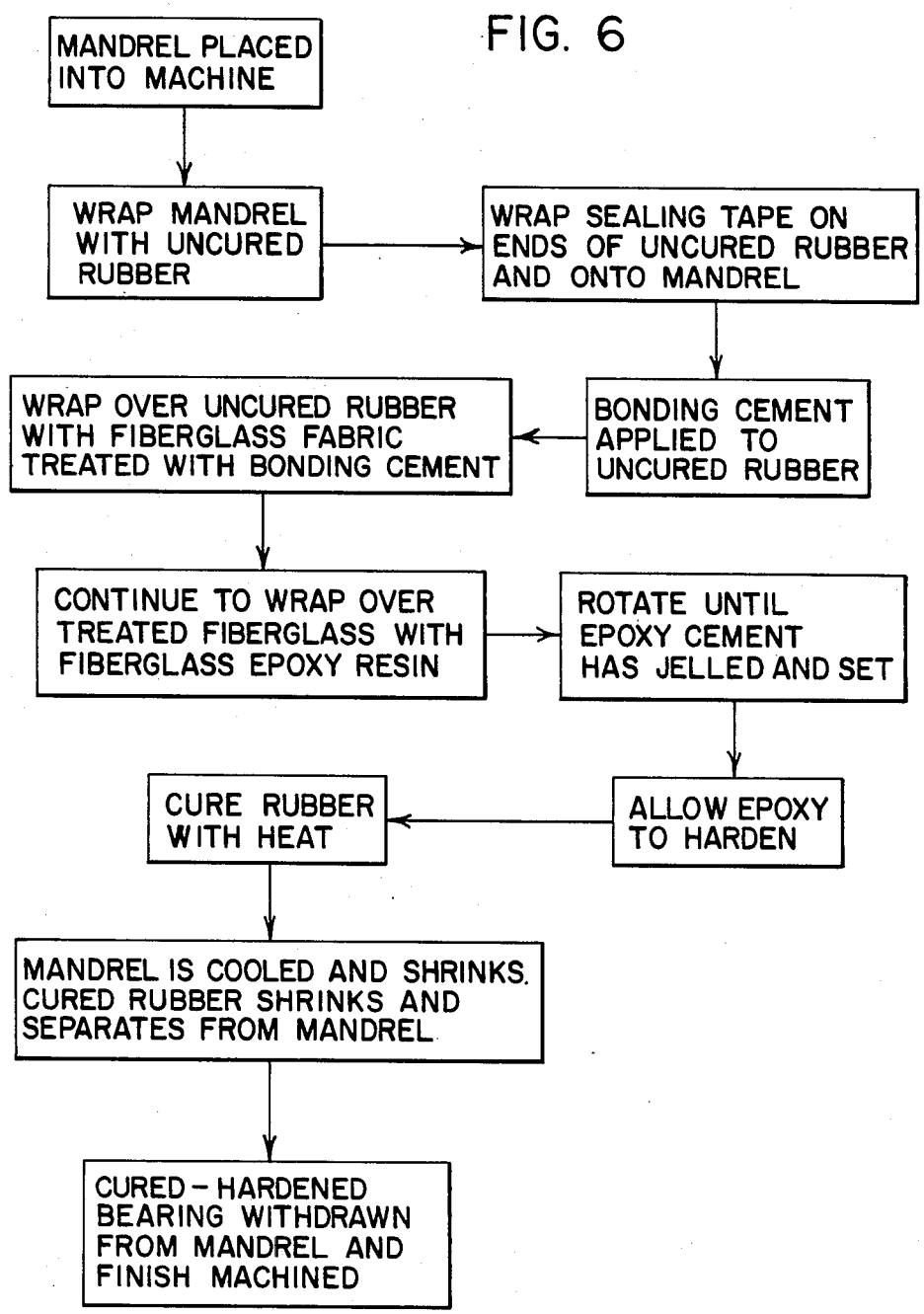
FIG. 6 is a flow diagram of the process for making a bearing assembly.

As indicated in FIGS. 5 and 6, the respective ends of the ribbon of rubber on mandrel 10 are wrapped with a sealing tape 21 wherein the tape 21 extends over onto mandrel 10 to protect such mandrel from cement and the epoxy resin that is to be applied to the fiberglass as to be described. A thin layer or film of a rubber bonding cement 23 is then sprayed, brushed or rolled, onto the exterior surface of the uncured rubber ribbon 18 on mandrel 10. A thin layer or layers of glass fabric sheets or ribbon is then wound onto the layer of cement 23 such as to impregnate the fabric with such cement to assure bonding. The number of glass fabric cement impregnated layers applied to the ribbon of rubber is determined by the strength needed. In some instances it may be desirable to coat the second or subsequent layers of glass fabric with the cement prior to their application to the first layer that is in contact with the bonding cement 23 to assure a complete bonding.

Figure 3:
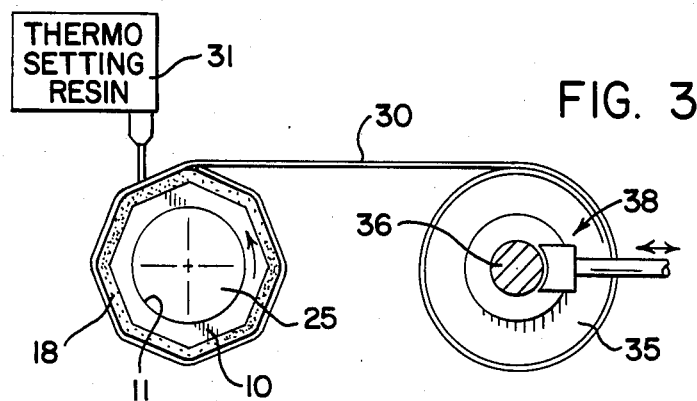
FIG. 3 is a schematic side elevational view, partly in section, depicting the wrapping of fiberglass fabric onto a mandrel supporting a layer of elastomeric material while impregnating the wrapping with epoxy resin.

To accomplish this step and the succeeding steps, mandrel 10 with the ribbon of rubber 18 and the film of bonding cement 23 is placed on a support or shaft 25 for rotation (FIG. 3). Shaft 25 is suitably rotated by means not shown but old and well known in the art. A woven fabric of fiberglass 30 is then wound onto the outer periphery of the bearing assembly being formed on mandrel 10 to first contact the cement and, as stated earlier, such initial layers are cement impregnated. Thereafter as the fiberglass 30 is wound thereon, the fabric is coated with an epoxy resin from a reservoir 31 with the aid of a doctor blade. The epoxy resin can be applied manually or by any known mechanical means.

The number of layers of impregnated fiberglass fabric 30 that are wound around the mandrel 10 is determined by the desired size needed.

A specific example of the epoxy resin useful in the present invention is one by the trade name "APCO" available from Applied Plastics Co., Inc. of El Segundo, Calif. The epoxy resin has a specific gravity of 1.165 and its accompanying hardener has a specific, gravity of 1.809. The epoxy resin has a Shore D 25° C. hardness of 84 with a glass transition temperature of 196° F. Another epoxy resin that can be used is "Everfix Epoxy Resin" having a density of 8.5 lbs. per gallon. The hardner used with such epoxy resin is a modified aliphatic amine adduct available through Fibre Glass-Evercoat Co., Inc., 6600 Cornell Road, Cincinnati, Ohio.

As shown in FIG. 3, the fiberglass fabric 30 is supplied from a storage roll 35 supported on an axle or shaft 36 driven in synchronism with shaft 25. A brake mechanism 38 is cooperative with shaft 36 to facilitate the winding operation.

The bearing assembly on completing the winding of the fiberglass is then slowly rotated until the epoxy resin has gelled and set. Additional time is then given to the epoxy resin to harden to form a rigid outer plastic shell 40. This can be accomplished by continuing the rotation of the bearing assembly in the mandrel or to set aside the bearing assembly until the epoxy has hardened. Thereafter the elastomeric material or rubber ribbon is cured into a sleeve as by placing the entire bearing assembly into a hot air oven, a steam autoclave or liquid curing bath. In such instance, the rigid fiberglass-epoxy or plastic outer shell 40 becomes a mold to contain the rubber 18 and the layer of cement 23 thereby resisting the curing pressures as the rubber 18 expands and vulcanizes.

An alternative method of curing the layer of rubber 18 is to retain the uncured bearing assembly on the hollow mandrel 10 and to remove it from the support or shaft 25 and thence after the epoxy has hardened to introduce steam or hot air into bore 11 of mandrel 10 to effect vulcanization of the rubber 18. Another method to effect vulcanization of the rubber 18 is to utilize CALROD type heating mandrels or inserts within the bore 11 of mandrel 10. By such vulcanization process the rubber is cured and the rubber cement layer 23 adheres to the fiberglass layer or layers and to the fiberglass impregnated with the epoxy to form a unitary integral bearing assembly 50.

The housing assembly 50 is removed from the curing environment or apparatus used, such as the autoclave, and allowed to cool. As the bearing assembly 50 cools, the mandrel 10 shrinks decreasing its outside diameter while simultaneously therewith the layer of rubber 18 shrinks decreasing its inside diameter while retaining its bond to the rigid plastic outer shell 40. This combined action frees the bearing assembly 50 from the mandrel 10 and facilitates the withdrawal of the mandrel 10 from the bearing assembly 50. Thereafter the bearing assembly 50 is machined along lines A—A and B—B (FIG. 5) to a finished specified length as well as machined to a specified outside diameter.

The thus described bearing assembly and the process for the manufacture thereof as described is a cost effective way of manufacturing such water lubricated bearing assemblies.

It will be apparent that although a specific embodiment and certain modifications of the invention have been described in detail, the invention is not limited to the specifically illustrated and described constructions since variations may be made without departing from the principles of the invention.

I claim:

1. A method of fabricating a bearing assembly comprising the steps of first wrapping an uncured layer of an elastomer onto a mandrel having a polygonal outer surface in cross section to form a layer of an elastomeric material, thence wrapping a sealing tape around the respective ends of said uncured layer of elastomer and adjacent surfaces of said mandrel, thence coating the outer surface of said elastomeric layer with a thin film of cement adhesive, thence wrapping fiberglass fabric onto said cement coated elastomeric layer for adherence thereto, thence wrapping onto said fiberglass layer additional layers of fiberglass while impregnating said additional fiberglass layers with a plastic resin, curing said resin to form a rigid plastic outer shell, and thence curing said elastomeric layer after the curing of said outer shell to form a bearing assembly.

2. A method of fabricating a bearing assembly as set forth in claim 1 wherein the respective ends of said bearing assembly are cut off after the curing of said elastomeric layer of said bearing assembly.

3. A method of fabricating a bearing assembly as set forth in claim 2 wherein said elastomer is a ribbon of rubber, said ribbon of rubber overlaps an adjacent ribbon of rubber in said wrapping of an uncured elastomer, and said ribbon is wrapped onto said mandrel in several passes back and forth across said mandrel.

4. A method of fabricating a bearing assembly comprising the steps of wrapping an uncured sheet of elastomer onto a mandrel having a polygonal shaped outer surface in cross section to form an elastomeric layer thereon, said sheet of elastomer is a single sheet that is substantially the full width of said mandrel, applying a film of cement onto the outer surface of said elastomeric layer, wrapping a plurality of layers of fiberglass fabric sheets onto said cement for penetration thereof and for adherence thereto, thence wrapping additional sheets of fiberglass fabric onto said mandrel while impregnating such plies of fiber fabric with a plastic resin, curing said resin to form a rigid plastic outer shell, and thence curing said elastomeric layer to form a rigid integral bearing assembly.

5. A method of fabricating a bearing assembly as set forth in claim 4 wherein said wrapping of fiberglass fabric sheets into contact with said cement is at least a single layer with subsequent wrapped layer sheets of fiberglass fabric being with cement applied thereto to assure complete impregnation of said fiberglass fabric layers with said cement.

* * * * *